United States Patent [19]

Gupta et al.

[11] Patent Number: 5,434,708
[45] Date of Patent: Jul. 18, 1995

[54] OPTICAL REPRODUCING APPARATUS ULTILIZING A POLARIZATION BEAM SPLITTER

[75] Inventors: Mool C. Gupta, Webster; David B. Kay, Rochester, both of N.Y.

[73] Assignee: Eastman Kodak Company, Rochester, N.Y.

[21] Appl. No.: 891,148

[22] Filed: Sep. 8, 1992

[51] Int. Cl.⁶ .................... G02B 5/18; G02B 27/44; G11B 7/00
[52] U.S. Cl. .................. 359/566; 359/569; 359/573; 359/576; 359/571; 369/112
[58] Field of Search ............. 359/566, 568, 569, 571, 359/573, 576; 369/44.32, 110, 112

[56] References Cited

U.S. PATENT DOCUMENTS

| | | | |
|---|---|---|---|
| 4,458,980 | 7/1984 | Ohki et al. | 359/18 |
| 4,665,310 | 5/1987 | Heemskerk | 250/201 |
| 4,672,187 | 6/1987 | Fujita et al. | 250/201 |
| 4,733,065 | 3/1988 | Hoshi et al. | 250/201 |
| 4,868,803 | 9/1989 | Sunagawa et al. | 369/44 |
| 4,873,678 | 10/1989 | Nakamura et al. | 369/13 |
| 4,945,525 | 7/1990 | Yamamoto et al. | 369/44.12 |
| 5,015,835 | 5/1991 | Ohuchida et al. | 250/201.5 |
| 5,029,154 | 7/1991 | Sumi et al. | 369/112 |
| 5,085,496 | 2/1992 | Yoshida et al. | 359/569 |
| 5,101,389 | 3/1992 | Ohuchida et al. | 369/44.23 |
| 5,257,131 | 10/1993 | Yoshida et al. | 369/110 |
| 5,258,871 | 11/1993 | Gupta | 359/566 |

*Primary Examiner*—Loha Ben
*Assistant Examiner*—Darryl J. Collins
*Attorney, Agent, or Firm*—Raymond L. Owens

[57] ABSTRACT

Optical reproducing apparatus utilizes a dual diffraction grating having first and second diffraction gratings with the diffraction gratings oriented at an angle with respect to one another to polarize an incident return beam into TM and TE components. TM and TE components emerge from the dual diffraction grating at a slight angle with respect to one another and are focused on a photodetector chip by an objective lens. In accordance with a first specific embodiment of the apparatus, the TM and TE polarized components are focused directly on a photoelectric chip, with the TE component focused on a spot size focus detector comprised of three rectangular photoelectric elements. One photoelectric element is disposed between the other two with a pair of parallel interfaces. Disturbances introduced into the TE beam are in the direction of the parallel interfaces, rendering the spot size focus detector wavelength-insensitive. In a second embodiment of the invention, the TE and TM beams are split into four sub-beams by a quad prism prior to impinging on a photodetector chip.

14 Claims, 5 Drawing Sheets

OPTICAL REPRODUCING APPARATUS ULTILIZING A POLARIZATION BEAM SPLITTER

FIELD OF THE INVENTION

The present invention relates to optical reproducing apparatus employing dual diffraction gratings as polarization beam splitters, and, more particularly, the instant invention relates to such apparatus useful in optical disk heads where light reflected from an optical recording medium, such as a write-once, erasable, or read-only optical disk, is polarized for various purposes.

BACKGROUND ART

In general, in order to reduce access time of an optical disk apparatus, it is important to reduce the size and weight of optical heads. In conventional systems, a track signal, a focus signal, and an RF (high frequency) signal are detected by individual optical systems which require a plurality of optical parts with a correspondingly complex structure. The complicated structure both increases the weight and complexity of the optical head. Attempts have been made to reduce the size and weight of optical pick-ups by utilizing high-density gratings; however, with high-density gratings, the angle of diffracted light tends to deviate due to fluctuations in the wavelength of laser light emanating from the semiconductor laser and must be accounted for in the design. Reduction in cost is also desirable.

It is a current practice to use a Wollaston or Rochon polarizing prism in M-O (magneto-optical) optical heads that split incident beams into two component beams exiting from the prism at small angles (a few degrees) with respect to one another. Moreover, these prisms readily separate the incident beam into TE and TM components. While these features of Wollaston and Rochon prisms do facilitate a single detector package design and are desirable in MO-differential RF signal detection, these prisms are very expensive. In addition, these prisms are relatively heavy.

An approach to this problem is to utilize an optical head which employs a dual diffraction grating for separating light reflected from the optical disk to perform the light signal detecting function. Exemplary of this approach is the disclosure of U.S. Pat. No. 5,029,154 to Sumi et al., in which a quartz substrate has diffraction gratings etched on opposite sides thereof. Sumi et al. is in contrast to approaches such as that of U.S. Pat. Nos. 4,945,525 and 4,672,187 to Yamamoto et al. and Fujita et al., respectively, in which two separate diffraction gratings in spaced relation to one another are used to separate a beam of coherent light into first and second components, such as TE and TM components, for use in generating tracking error, focusing error, and information signals.

While U.S. Pat. No. 5,029,154 to Sumi et al. discloses the concept of a dual diffraction grating, the light beams are separated utilizing gratings of different pitch or different geometrical configuration. Moreover, in Sumi et al., the gratings are on opposite sides of a single substrate. Once one side of a substrate has been etched to provide a first grating, it is extremely difficult to protect the first grating while fabricating the second grating. Moreover, with the approach of Sumi et al., it is necessary to insert a focusing lens between the double grating and the beam reflected from the optical disk.

In view of the Sumi et al. structure and the difficulties associated therewith, there is a need for improvement in and alternative approaches to the dual diffraction grating concept.

SUMMARY OF THE INVENTION

It is an object of the present invention to provide new and improved apparatus employing a new and improved dual diffraction grating useful in optical disk heads.

In view of this and other objects, the instant invention contemplates apparatus for monitoring a return light beam reflected from an optical recording medium which utilizes a dual diffraction grating having first and second diffraction gratings which are angularly displaced with respect to one another. The dual diffraction grating splits the return light beam into first and second components which emerge from the dual diffraction grating displaced from one another at a small angle. A lens focuses the first and second components onto a photodetector array which includes a first detector upon which the first component is focused to generate a tracking error signal and an RF signal and a second detector upon which the second component is focused for generating a focus error signal.

In accordance with a more specific aspect of the invention, the first and second detectors are fabricated on a single chip. In accordance with a preferred embodiment, the first detector comprises a pair of photodetector elements juxtaposed with one another, and the second detector comprises first, second, and third photodetector elements, with the second photodetector element being juxtaposed with the first and second elements along a pair of parallel interfaces. The parallel interfaces are oriented with respect to the second component of the light beam so that variations in the second component move parallel to the interfaces, thereby providing wavelength-insensitive focus detection.

In accordance with a second embodiment of the invention, a quad prism is utilized to refract the first and second polarized components of the light beam into eight sub-beams, each of which is focused on a separate photodetector element. The outputs from these eight elements are then summed through an array of differential amplifiers to provide an RF signal, a focus error signal and a tracking error signal.

BRIEF DESCRIPTION OF THE DRAWINGS

Various other objects, features, and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
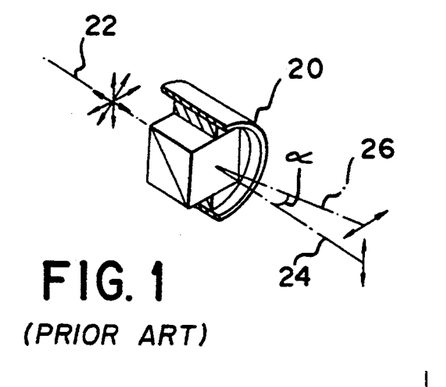
FIG. 1 is a perspective view illustrating a polarizing prism used in prior art apparatus.

Referring now to FIG. 1, there is shown a prism 20, which is representative of a Rochon polarizing prism or Wollaston polarizing prism utilized in apparatus of the prior art for polarizing an incident light beam 22 into TM and TE components 24 and 26, respectively. TE and TM components are, by definition, orthogonal to one another, and the Rochon and Wollaston polarizing prisms separate the components by an angle $\alpha$ which is, in practice, relatively small. The Rochon and Wollaston polarizing prisms are relatively expensive.

Figure 2:
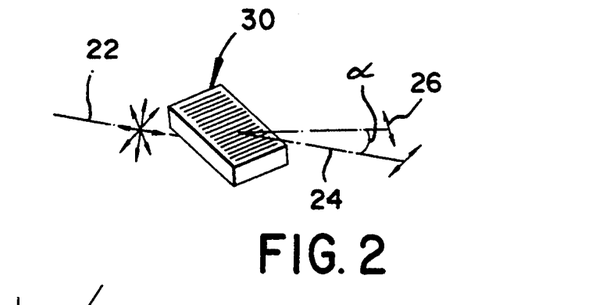
FIG. 2 is a perspective view of a dual grating utilized with the apparatus of the present invention.

Referring now to FIG. 2, there is shown a dual diffraction grating, designated generally by the numeral 30 and configured in accordance with the principles of a copending, commonly assigned patent application U.S. Pat. No. 5,258,871, issued on Nov. 2, 1993, entitled "DUAL DIFFRACTION GRATING BEAM SPLITTER," invented by Mool Gupta, in which a dual grating is utilized in the apparatus of the present invention. Like the Rochon and Wollaston polarizing prisms of FIG. 1, the dual grating beam splitter 30 also splits the incident beam 22 into polarized orthogonal components 24 and 26, which are TM and TE components separated by an angle $\alpha$. The angle $\alpha$ is in the range of 0.1° to 3.0° and has a preferred range of 0.3° to 1.0°, with a preferred specific magnitude of about 0.5°.

Figure 3:
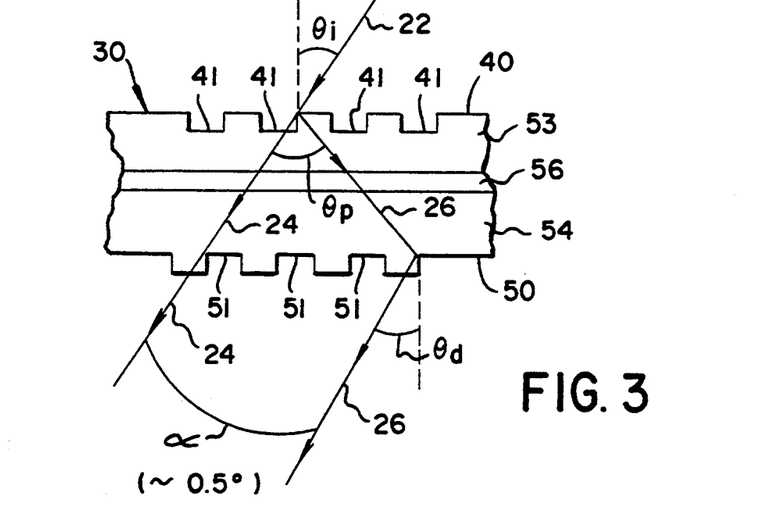
FIG. 3 is a schematic view illustrating how the dual grating of FIG. 2 polarizes a coherent light beam into first and second components.

Referring now to FIG. 3, where an enlarged portion of the dual diffraction grating 30 is schematically shown, it is seen that the incident beam 22 approaches the dual diffraction grating at an angle of incidence $\Theta_i$ and is diffracted by a first diffraction grating 40 into the first and second polarized components 24 and 26, which are at an angle $\Theta_p$ with respect to one another. The component 24 is polarized as a TM component while the component 26 is a TE component so that the lightwaves comprising these components oscillate in directions orthogonal to one another. The TM component or first component 24 is substantially transmitted by the first diffraction grating 40, while the second component 26 is diffracted with respect to the first component by the angle $\Theta_p$ which is relatively large. Since, when utilizing the single diffraction grating 40, the angle $\Theta_p$ is relatively large, the angle between the first and second components 24 and 26 would be too large because photodetectors sensing the first and second components would have to be spaced a considerable distance from one another. This is antithetical to the desirable concept of having photodetectors as close to one another as possible and practical.

In order to decrease the angle between the first and second polarized components 24 and 26, a second diffraction grating 50 having diffraction grooves 51 therein is disposed parallel to and spaced from the first diffraction grating 40. The grooves 41 of the first diffraction grating 40 and the grooves 51 of the second diffraction grating 50 are straight grooves which are disposed at an angle $\beta$ with respect to one another. The structure of the resulting dual diffraction grating 30 is specifically set forth in the copending, commonly assigned patent application entitled "DUAL DIFFRACTION GRATING BEAM SPLITTER", incorporated herein by reference. The second diffraction grating 50 substantially transmits the first polarized component 24, but diffracts the second polarized component 26 by an angle $\Theta_d$ enough toward the first polarized component so that the first and second polarized components emerge from the dual diffraction grating at the angle $\alpha$ with respect to one another.

Figure 4:
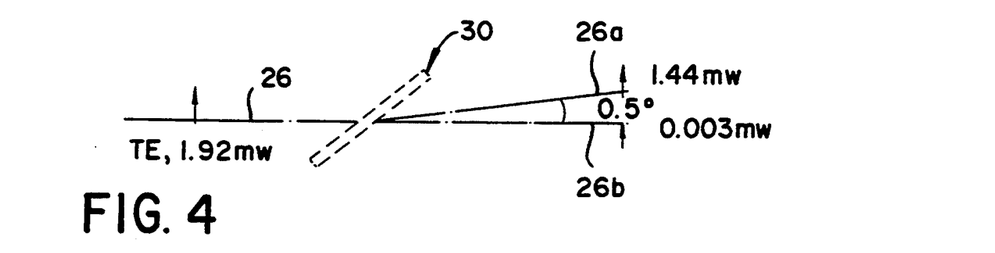
FIG. 4 is a schematic view illustrating TE light beam diffraction efficiency of the dual grating of FIGS. 2 and 3.

Referring now to FIG. 4, the dual diffraction grating 30 is shown diffracting a TE polarization component (the second polarized component 26). In accordance with experimental measurements using a coherent light beam having a wavelength of 633 nm, it was found that the dual diffraction grating 30 performed adequately when compared to the Rochon and Wollaston polarizing prisms 20 illustrated in FIG. 1 with respect to diffraction efficiency and extinction ratio. With respect to the TE component 26, a 1.92 mw TE beam is diffracted about 0.5° into a diffracted component 26a of 1.44 mw and an undiffracted component 26b of 0.003 mw, resulting in a TE diffraction efficiency of 75% (1.44 mw/1.92 mw = 75%). The intensity of the transmitted component 26b of the TE component 26 was lower than the diffracted portion 26a by a factor of 480.

Figure 5:
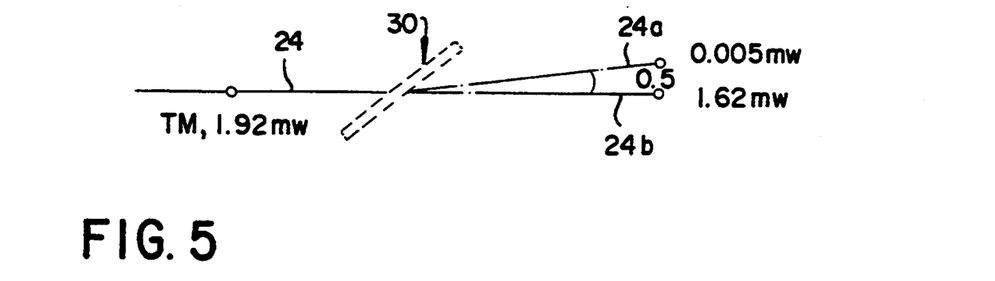
FIG. 5 is a schematic view illustrating TM light beam diffraction efficiency of the dual grating of FIGS. 2 and 3.

Referring now to FIG. 5, the dual diffraction grating 30 is shown diffracting a TM polarized component (the first polarized component 24). It is seen that the TM component 24 having a wavelength of 633 nm and a power of 1.92 mw undergoes a diffraction of 0.5°, with the diffracted portion 24a having a power of 0.005 mw and the transmitted portion 24d having a power of 1.62 mw. For the TM component 24, the transmitted efficiency is 84% (1.62 mw/1.92 mw = 84%). With the TM polarized component 24, the intensity of the diffracted portion of the beam 24a is less than the transmitted portion of the beam 24b by a factor of 324. The extinction ratios for diffracted portions 26a and 24a of the TE and TM beams 26 and 24 has 1:228 (0.005 mw/1.4 mw = 1:288). The extinction ratio for the transmitted portions 26b and 24b of the TE and TM components 26 and 24 was measured at 1:540 (0.003 mw/1.62 mw = 1:540). The results indicated by the experiments illustrated in FIGS. 4 and 5 demonstrate very good separation of the incident beam 22 by the dual diffraction grating 30 with nearly equal beam splitting. Although the Rochon and Wollaston prisms 20 of FIG. 1 are capable of extinction ratios of 1:10$^5$, the dual diffraction grating 30 performs acceptably when compared to beam splitting prisms as commonly used in MO-differential detection.

Figure 6:
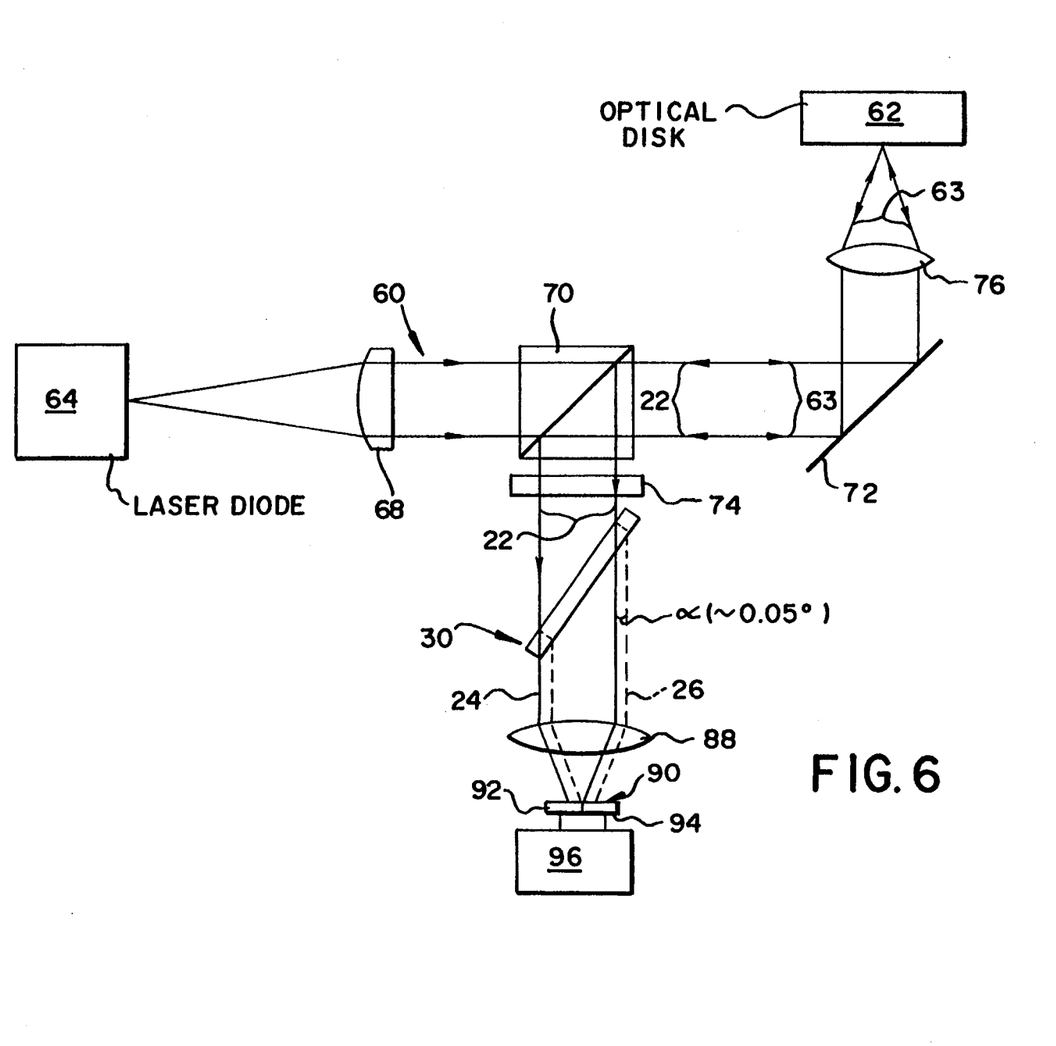
FIG. 6 is a schematic view of apparatus in accordance with the present invention, wherein the dual diffraction grating of FIGS. 2–5 is employed to polarize a return beam reflected from an optical disk.

Referring now to FIG. 6, the dual diffraction grating 30 is shown utilized with the apparatus designated generally by the numeral 60. The apparatus 60 is a system utilized for MO-differential detection, wherein an optical disk 62 is read with a coherent light beam 63 emanating from a laser source 64. The beam of coherent light 63 from the laser diode 64 is collimated by a collimated lens 68 before passing through a partial polarizing beam splitter 70. The coherent light beam 63 is then reflected from a mirror 72 and passed through an objective lens 76, which sharply focuses the beam of coherent light on the optical disc 62. The beam of coherent light 63 is then reflected back from the optical disk 62 as the return beam 22 (see FIG. 2) which passes back through the objective lens 76 and is then reflected by the mirror 72 back into the partial polarization beam splitter 70, which directs part of the return beam through a compensating wave plate 74 into the dual diffraction grating 30 (FIGS. 2-5) of the instant invention.

The dual diffraction grating 30 splits the return beam 22 into the first and second orthogonally polarized components 24 and 26 (TM and TE beams), which components are focused by an objective lens 88 onto a photodetector chip components, designated generally by the numeral 90, comprised of photodetector arrays 92 and 94. The outputs of the photodetector arrays 92 and 94 are further processed by electrical circuitry, designated generally by the numeral 96, which provides a reproduction signal analogous to the information on the optical disk 62, as well as tracking and focusing error signals for controlling the system 60 by, for example, adjusting the position of the objective lens 76.

In a preferred embodiment of the dual diffraction grating 30, the first diffraction grating 40 is formed on a substrate 53, and the second diffraction grating 50 is formed on a substrate 54. The substrates 53 and 54 are bonded with a layer of optical adhesive 56 and rotated with respect to one another so that the straight grooves are offset at an angle with respect to one another in the range of about 0.1° to 5.0° according to the teachings of the previously mentioned copending application entitled "DUAL GRATING BEAM SPLITTER."

It is important to minimize the size and weight of the optical head incorporating the various elements of the system 60. To this end, it is desirable to keep the photodetectors 92 and 94 in close proximity to one another while maintaining separation between the first and second polarized components 24 and 26 of the return light beam 22 incident upon the dual diffraction grating 30. The angle $\alpha$ between the first and second polarized components 24 and 26 is desirably within the range of 0.1° to 3° and preferably within the range of 0.3°-1.0°, with a preferred single magnitude of about 0.5°. When the angle $\alpha$ is within these ranges and the first and second polarized components 24 and 26 are focused through an objective lens 88, the photodetector arrays 92, 94 can be conveniently fabricated on a single chip, thus minimizing the size and weight of the head employing the apparatus 60.

In the arrangement shown in FIG. 6, the apparatus 60 employs an objective lens 88 between the dual diffraction grating 30 and the photodetecting substrate 90 so as to precisely focus the first and second polarized components 24 and 26. In the apparatus 60, there is no objective lens between the prism 70 and dual diffraction grating 30, as is the case with U.S. Pat. No. 5,029,154 to Sumi et al. By transmitting the return beam 22 directly from the prism 70 through the dual diffraction grating 30, no coma and astigmatism is introduced into the return beam.

Figure 7:
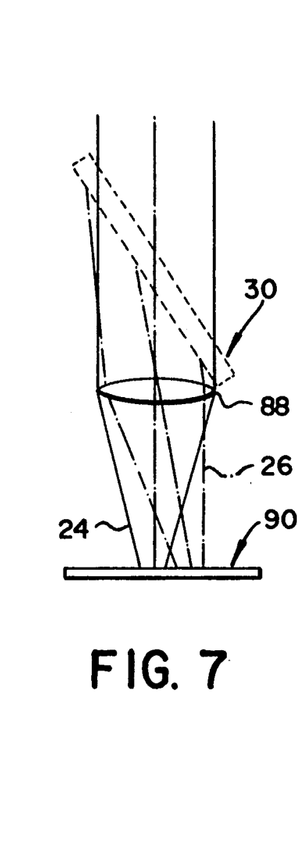
FIG. 7 is a schematic view of a first specific embodiment of the instant invention, wherein a return beam is focused on a photodetector chip.
Figure 8:
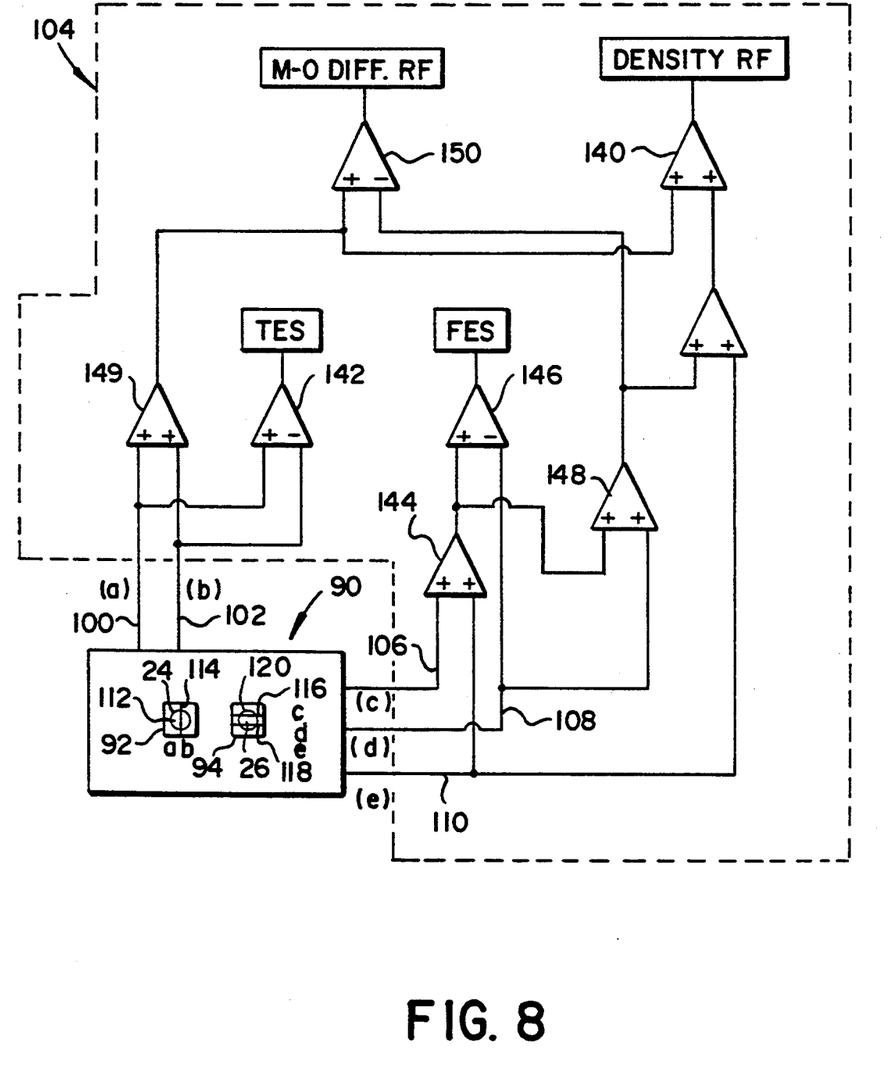
FIG. 8 is a schematic view showing the photodetector chip of FIG. 7 in combination with associated computational circuitry.

Referring now to FIGS. 7 and 8, there is shown a first specific embodiment of the general invention shown in FIG. 6. In this first specific embodiment, the first polarized beam 24, which is the TM transmitted beam, is focused on the first photodetector 92, while the second polarized component 26, which is the TE diffracted beam, is focused on the second photodetector 94. In FIG. 7, the angle $\alpha$ between the first and second components 24 and 26 is shown for the situation in which $e_d$ of the second diffraction by diffraction grating 50 (see FIG. 3) is large enough for the second polarized component 26 to actually cross the first polarized component 24 instead of diverging therefrom upon emerging from the dual diffraction grating 30. Preferably, the first and second photodetectors 92 and 94 are fabricated on a single chip 90 utilizing techniques well known in the art. The first photodetector 92 has first and second photodetector elements a and b, while the photodetector 94 has third, fourth, and fifth photodetector elements c, d, and e. The photodetector elements a and b are connected by lines 100 and 102 to a computational circuit, designated generally by the numeral 104, and the photodetector elements c, d, and e are connected thereto by lines 106, 108, and 110.

Photodetector elements a and b are identical rectangles, with the focus spot 112 of the beam 24 centered on the interface 114 between the elements a and b. The output on lines 100 and 102 varies directly with the quantity of light detected by the photodetector elements a and b. The density data or information on the disk 62 (see FIG. 6) is contained in the density RF signal, which is equal to the sum of the quantity of light detected by all of the photodetector elements, in other words:

Density RF signal $=(a+b+c+d+e)$.

Since the density RF signal is the sum of all of the light detected by the photodetector elements a through e, it remains the same regardless of the position of the focus spot 112 as long as the focus spot remains somewhere on the detector 92.

The push-pull tracking error signal (TES) is determined by subtracting the quantity of light detected by photodetector element b from that detected by photodetector element a, in other words:

Push-Pull Tracking Error Signal (TES)$=(a-b)$.

As long as the tracking error signal is zero, the apparatus 60 is tracking correctly. If, however, the tracking error signal is positive or negative, the lens 76 is moved by an activator (not shown) in accordance with conventional servo techniques to recenter the focus spot 112 so that the value of a−b is restored to zero.

The photodetector elements c, d and e comprising the detector 94 form a spot size focus detecting arrangement wherein the three photodetector elements are similar rectangles oriented at 90° with respect to the photodetector elements a and b of detector 92. The fourth element d is disposed between the third and fifth elements c and e and is juxtaposed therewith along parallel interfaces 116 and 118. The second polarized component 26 which forms the TE diffraction beam has a focus spot 120 which overlaps the third, fourth, and fifth photodetectors elements c, d and e. The focus error signal (FES) is derived by subtracting the quantity of light measured by photodetector element d from the sum of the amount of light detected by photodetector elements c and e, in other words:

Focus Error Signal (FES)=$(c+e)-d$.

When the focus error signal (FES) equals zero, the lens 76 of the apparatus 60 (see FIG. 6) is in focus. When the focus error signal is greater or less than zero, the lens 76 is driven by an activator (not shown), in accordance with well-known procedures, toward and away from the disc 62 so as to drive the focus error signal back to zero.

In accordance with the principles of the instant invention, the photodetector 94 is a spot size photodetection arrangement wherein, when the focus area 120 decreases in size, the value of d becomes greater than the value of c+e; and, when the focus error signal increases in size, the value of c+e becomes greater than the value of d. Since the interface lines 116 and 118 are parallel to the polarization direction of the second polarized component 26, variations of the diffraction angle of the gratings 40 and 50 caused by variations in the wavelength of the incident return beam 22 will not result in an offset of the focus error signal (FES) because displacement of the focus spot 120 is parallel to the interfaces 116 and 118. Accordingly, the arrangement of the spot size focus detector 94 is wavelength-insensitive.

Also of use in controlling the apparatus 60 is the M-O differential RF signal, which is determined by subtracting the quantity of the light from the second polarized component 26, which is the TE diffraction beam, from the quantity of light of the first polarized component 24 which is the TM transmitted beam, in other words:

M-O differential RF signal=$(a+b)-(c+d+e)$.

The M-O differential RF signal detects the rotation of the plane of polarization of the light beam at the time the light beam is reflected from the magneto-optical disc 62. This rotation results in the differential change in the output signals from the photodetectors 92 and 94. Intensity noise is cancelled in the M-O differential RF signal detection so as to provide a high signal-to-noise ratio for the RF signal, thus providing accurate output information. U.S. Pat. No. 4,868,803 to Sunagawa et al., incorporated herein by reference, provides a detailed discussion of the use for the M-O differential RF signal.

Computational circuitry 104 includes an array of differential amplifiers arranged to add and subtract signals generated by the first and second detector elements a and b, detecting the first polarized beam 24, and the third, fourth, and fifth detector elements c, d and e, detecting the second polarized component 26. Differential amplifier 140 adds signals a and b to signals c, d and e to produce the RF density signal for reading density marks in the optical disc 62 (FIG. 6), while the differential amplifier 142 provides a tracking error signal by subtracting the signal b from the signal a. The second polarized component 26 provides input signals c and e, which are added in differential amplifier 144, the output of which is applied to differential amplifier 146. Also applied to differential amplifier 146 is signal d on line 108, which is subtracted in the amplifier from the sum of the signals c+e to produce the focus error signal (FES). The M-O differential RF signal is determined by subtracting the output of differential amplifier 148 from the output of differential amplifier 149 in a differential amplifier 150. The output from the differential amplifier 148 is determined by adding the signal d to the sum of signals c+e determined by differential amplifier 144.

Figures 9, 10:
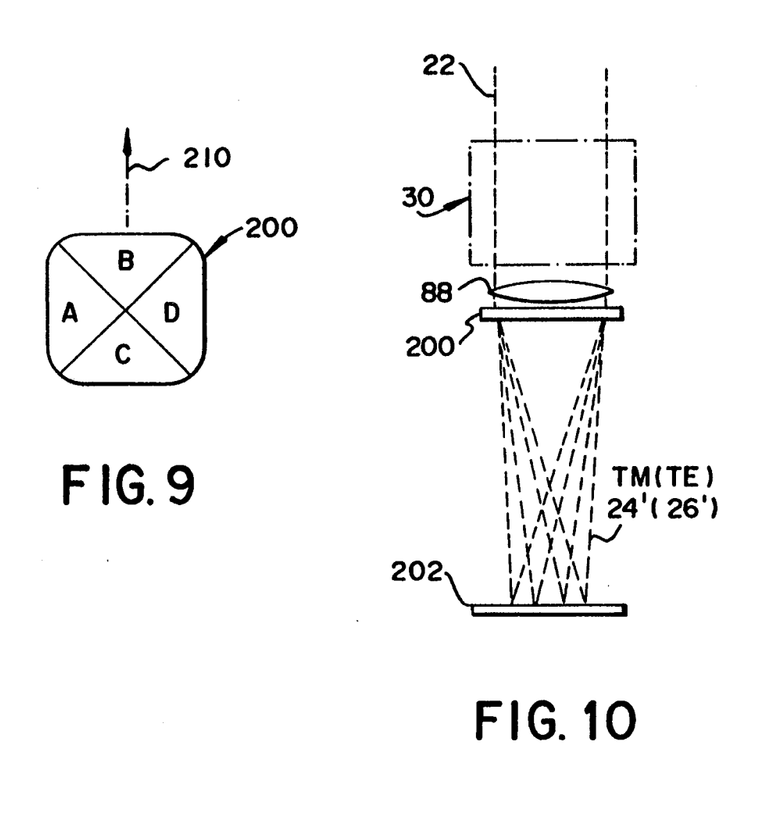
FIG. 9 is a schematic view of a quad prism utilized with a second specific embodiment of the instant invention.
FIG. 10 is a side view of apparatus employing the quad prism of FIG. 9 in combination with the dual grating of FIGS. 2–5 and a photodetector chip.
Figure 11:
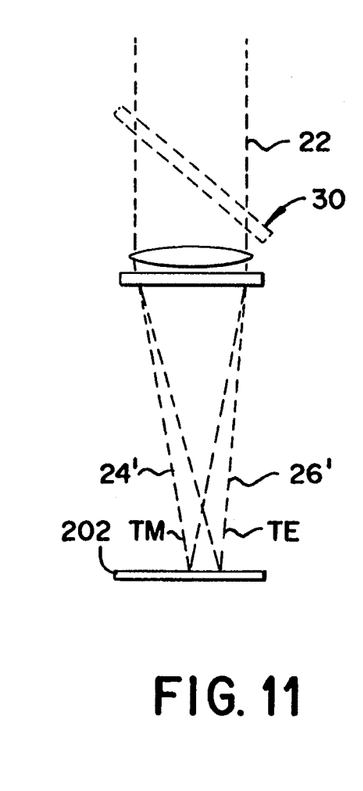
FIG. 11 is a side view of the apparatus of FIG. 10.

While the embodiment of FIGS. 7 and 8 is preferred and is shown in use with a far-field sensing scheme, a second specific embodiment is shown in FIGS. 9-12 and is especially useful in near-field sensing schemes. FIG. 9 schematically illustrates a quad prism (available from Nippon Electric Corporation), designated generally by the numeral 200, with facets A, B, C, and D. As is seen in FIGS. 10 and 11, the quad prism 200 is disposed between the objective lens 88 (see FIG. 6) and a photodetector chip 202 so as to produce eight sub-beams from the two polarized components 24 and 26 created by the dual diffraction grating 30 with four sub-beams 24' being derived from component 24 and four sub-beams 26' being derived from component 26.

Figure 12:
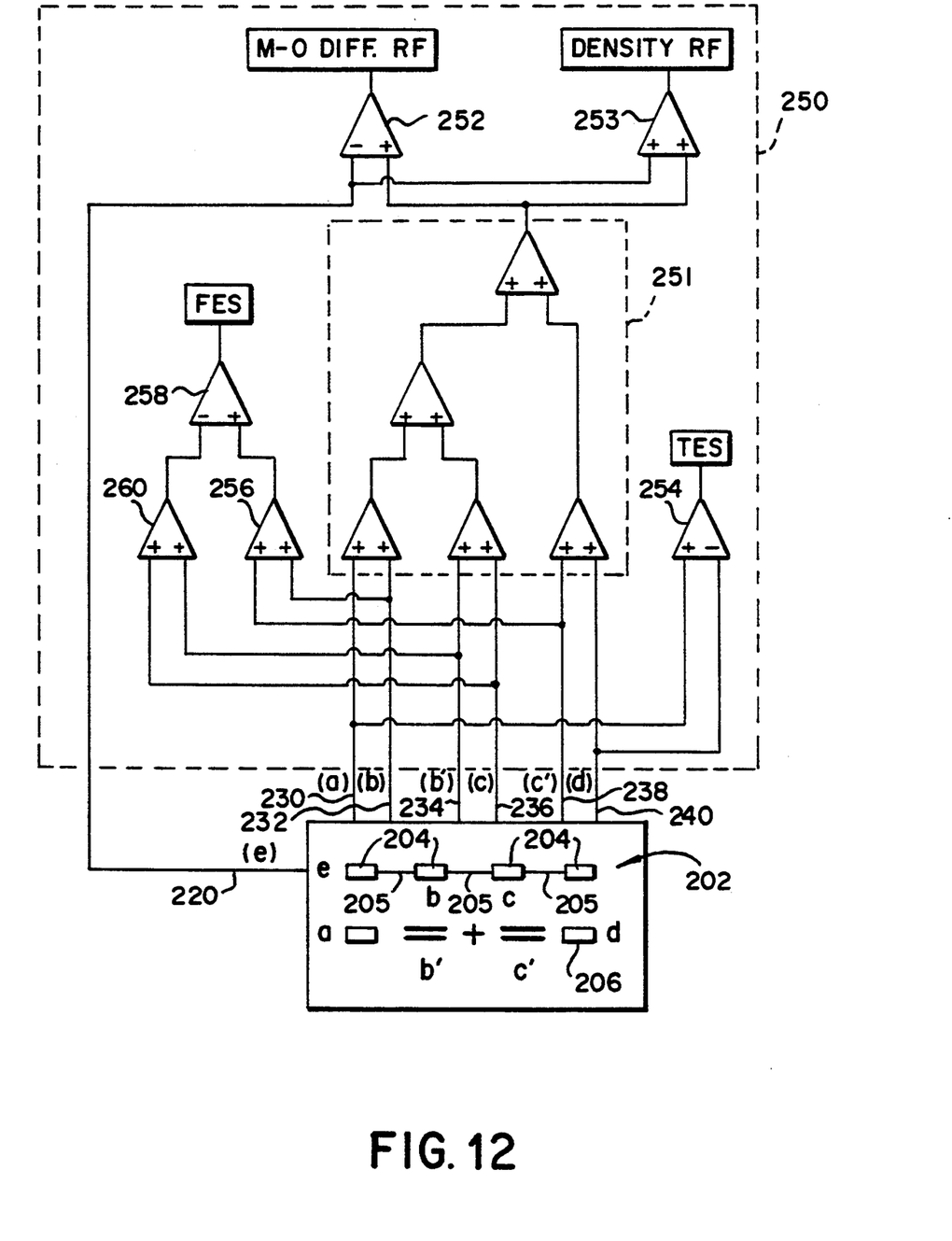
FIG. 12 is a schematic view showing the photodetector chip of FIGS. 10 and 11 connected to associated logic circuitry.

As is seen in FIG. 12, the photodetector chip 202 includes a first array of four photodetector elements 204 connected by conductors 205 to provide a composite element e and a second array of photodetectors 206 made up of photodetector elements a, b, b', c, c' and d. The photodetector elements 204 comprising the composite element e are arranged in a straight line as are the photodetector elements a, b, c and d. The photodetector elements b, b' and c, c' are parallel to one another and split.

Referring now again to FIG. 9, the facets A, B, C, and D of the quad prism 200 are tipped with respect to the track direction 210, with facets B and C tipped at opposite but equal angles with respect to the track direction, facet A tipped in the same direction as facet B, but at about two times the angle, and facet D tipped in the same direction as facet C, but at about two times the angle. The sub-beams 24' from the polarized first component 24 comprising TM light diffracted from facets A, B, C, and D of the quad prism 200 are focused at the centers of detectors a, b—b', c—c', and d, respectively. The four sub-beams 26' of the second polarized component 26 comprising TE light are focused on the individual detector elements 203 comprising the composite detector element e of 202.

In the configuration of FIG. 12, the differential MO-RF signal is generated by subtracting the value of e from the value of the sum of the detectors in the array 206, in other words:

Differential M-O RF=$(a+b+b'+c+c'+d)-e$.

The focus error signal (FES) is derived by subtracting the sum of the quantity of light measured by photodetector elements b' and c from the sum of the quantity of light measured by photodetector elements b and c', in other words:

Focus Error Signal (FES)=$(b+c')-(b'+c)$.

The push-pull tracking error signal is derived by subtracting the quantity of light measured by the photodetector element d from that measured by the photodetector element a, in other words:

Push-Pull Tracking Error Signal (TES)=$a-d$.

As with the embodiment of FIGS. 7 and 8, when the focus error signal FES is greater or less than zero, the objective lens 76 (FIG. 6) is moved by a servo system (not shown) toward and away from the optical disc 62 in order to bring the value of the focus error signal back to zero. When the tracking error signal is greater or less than zero, the lens 76 is moved by the servo system to bring the tracking error signal back to zero.

The density RF signal is the sum of all signals, in other words:

Density RF=$a+b+c+d+e$

In FIG. 12, the photodetector chip 202 has a single lead 220 connected to the array of photodetector elements e and separate leads 230, 232, 234, 236, 238 and 240, connected to the photodetector elements a, b, b', c, c', and d, respectively. The leads 220 and 230-240 are connected to a computation circuit 250, which provides the differential RF signal for conveying information and also a density RF signal on the optical disc 22 (FIG. 6) and the focus error and tracking error signals for controlling the position of the objective lens 76 (see FIG. 6).

The signal e is subtracted from the sum of the signals a-d derived from differential amplifier array 251 by differential amplifier 252 to produce the differential M-O RF signal analogous to the information on the optical disc 62. The push-pull tracking error signal (TES) is obtained by subtracting the value d, connected by lead 240, from the value a, connected by lead 230, in differential amplifier 254. The focus error signal (FES) is obtained by adding the value of b+c' connected to differential amplifier 256 by leads 230 and 232 and subtracting therefrom in a differential amplifier 258 the sum of b'+c connected to differential amplifier 260 by leads 234 and 238. Finally, the density RF signal is the sum of all signals added in differential amplifier 253.

The dual diffraction grating 30, when employed generally as shown in FIG. 6 or with specific detector arrays as shown in the first and second embodiments of FIGS. 7, 8, and 10-12, provides a lower cost alternative solution in which the Wollaston or Rochon prism 20 (FIG. 1) is replaced. Moreover, dual diffraction grating is useful for various data and servo signal detection arrangements, as is exemplified by the first signal detection embodiment of FIGS. 7 and 8 and the second signal detection embodiment of FIGS. 9-12.

The entire disclosure of all applications, patents, and publications, cited above and below, are hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. Apparatus for reading a return light beam reflected from an optical recording medium comprising:
a dual diffraction grating aligned with the return light beam having first and second, oppositely facing diffraction gratings of the same selected pitch and depth, the diffraction gratings being rotated at a selected angle with respect to one another, the pitch and depth being selected to transmit a first component of the return light beam and to diffract a second component of the return light beam, the components emerging from the dual diffraction grating at a small angle with respect to one another;

a lens for focusing the first and second components of the light beam emerging from the dual diffraction grating;

a photodetector array upon which the first and second components are focused by the lens, the photodetector array including a first detector means upon which one of the components is focused to generate a tracking error signal and a second detector means upon which the other of the components is focused for generating a focus error signal wherein the first detector means comprises first and second photodetector elements with an interface therebetween oriented in a selected direction and wherein second detector means comprises third, fourth, and fifth photodetector elements, with the fourth photodetector element being juxtaposed with the third and fifth photodetector elements along parallel interfaces oriented in a second direction, the parallel interfaces being oriented with respect to the second component so that variations in the second component move parallel to the interface, providing wavelength-insensitive focus detection and the focus error signal;

means for summing and differencing the output of the first and second detector means to generate a density RF signal and a M-O (magneto-optical) differential RF signal; and a quad prism disposed between the lens and the detector array, the quad prism having facets tipped about the track direction, with first and second oppositely positioned facets tipped at an equal but opposite angle to one another, a third facet tipped in the same angular direction as the first facet but at about twice the angle of the first facet, and a fourth facet tipped in the same angular direction as the second facet but at about twice the angle of the second facet, the facets dividing the first and second components into four sub-beams each, the detector array including a first array of four photodetectors for detecting the four sub-beams of the first component and a second array of four photodetectors for detecting the four sub-beams of the second component.

2. The apparatus of claim 1, wherein the angle at which the components emerge from the dual diffraction grating with respect to one another is about 0.1° to 3.0°.

3. The apparatus of claim 1, wherein the first component of the light beam is a TM component, and the second component is a TE component and wherein the pitches of the first and second gratings are sufficient to substantially diffract the TE component while substantially transmitting the TM component.

4. The apparatus of claim 1, including a quartz substrate and wherein the diffraction gratings we formed in the quartz substrate.

5. The apparatus of claim 4, wherein the quartz substrate is in the form of a single sheet and the first grating and second grating are formed on opposite sides of the single sheet of the quartz substrate.

6. The apparatus of claim 1, including first and second substrates and wherein the first grating is etched on the surface of the first substrate, and the second grating is etched on the surface of the second substrate of the substrate material and wherein the substrates are superimposed.

7. The apparatus of claim 1, wherein the photodetector detecting the sub-beams diffracted from the first and second facets are each split into pairs of subdetectors.

8. The apparatus of claim 7, wherein the M-O RF signal is generated by subtracting the total intensity measured by the first array of four photodetectors from the total intensity measured by the second array of four photodetectors, wherein a focus error signal is generated by adding the intensity of the subdetectors disposed diagonally to one another in each pair to one another to generate two sum signals and then subtracting one sum signal from another, wherein the tracking error signal is generated by subtracting the intensity of the sub-beam diffracted from the fourth facet from the intensity of the sub-beam diffracted from the third facet, and wherein the density RF signal is generated by adding the intensities measured by the photodetectors.

9. Apparatus disposed in an optical head for reading a return light beam reflected from an optical recording medium comprising:
   a dual diffraction grating having first and second, oppositely facing diffraction gratings of the same selected pitch and depth, the diffraction gratings being rotated at a selected angle with respect to one another, the pitch and depth being selected to transmit a first component of the return light beam and to diffract a second component of the return light beam, the components emerging from the dual diffraction grating at a small angle with respect to one another;
   a beam splitter for deflecting a portion of the return light beam from the optical disk into the dual diffraction grating without further focusing;
   a compensating wave plate disposed between the beam splitter and diffraction grating;
   a lens for focusing the first and second components of the light beam emerging from the dual diffraction grating, the lens directly opposite the dual diffraction grating;
   a photodetector array upon which the first and second components are focused by the lens, the photodetector array including a first detector means upon which one of the components is focused to generate a tracking error signal and a second detector means upon which the other of the components is focused for generating a focus error signal, wherein the first detector means comprises first and second photodetector elements with an interface therebetween oriented in a selected direction and wherein second detector means comprises third, fourth, and fifth photodetector elements, with the fourth photodetector element being juxtaposed with the third and fifth photodetector elements along parallel interfaces oriented in a second direction, the parallel interfaces being oriented with respect to the second polarized component so that variations in the second polarized component move parallel to the interfaces providing wavelength-insensitive focus detection, and the focus error signal being generated by subtracting the light quantity measured by the fourth photodetector element from the sum of the light quantities measured by the third and fifth photodetector elements; and
   means for summing and differencing the output of the first and second detector means to generate a density RF signal and an M-O (magneto-optical) differential RF signal.

10. The apparatus of claim 9, wherein the photodetector array is fabricated on a single chip.

11. The apparatus of claim 9, wherein the parallel interfaces of the second detector means extend in a direction perpendicular to the selected direction of the interface of the first detector means.

12. The apparatus of claim 11, wherein the pitch and depth of the diffraction gratings are selected to polarize the components of the return light beam so that the first component is a TM component and a second component is a TE component.

13. The apparatus of claim 9, wherein the angle with respect to one another at which the components emerge from the dual diffraction grating is in the range of about 0.1° to 3.0°.

14. The apparatus of claim 9, wherein the angle with respect to one another at which the components emerge from the dual diffraction grating is about 0.5°.

* * * * *